United States Patent
Zhang

(10) Patent No.: US 12,096,393 B2
(45) Date of Patent: Sep. 17, 2024

(54) METHOD AND DEVICE USED FOR RELAY WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 349 days.

(21) Appl. No.: 17/725,575

(22) Filed: Apr. 21, 2022

(65) Prior Publication Data

US 2022/0248365 A1 Aug. 4, 2022

Related U.S. Application Data

(63) Continuation of application No. PCT/CN2021/077464, filed on Feb. 23, 2021.

(30) Foreign Application Priority Data

Feb. 25, 2020 (CN) .......................... 202010116831.0
Feb. 28, 2020 (CN) .......................... 202010129422.4

(51) Int. Cl.
*H04W 64/00* (2009.01)
*H04L 5/00* (2006.01)
(Continued)

(52) U.S. Cl.
CPC ......... *H04W 64/003* (2013.01); *H04L 5/0053* (2013.01); *H04W 52/283* (2013.01); *H04W 52/367* (2013.01)

(58) Field of Classification Search
CPC ............. H04W 64/003; H04W 52/283; H04W 52/367; H04W 52/383; H04W 52/242; H04L 5/0053; H04B 7/15528
(Continued)

(56) References Cited

U.S. PATENT DOCUMENTS 10,499,406 B1 * 12/2019 Marupaduga ......... H04W 72/20
2015/0327180 A1 11/2015 Ryu
(Continued)

FOREIGN PATENT DOCUMENTS

CN 105813159 A 7/2016

OTHER PUBLICATIONS

ISR received in application No. PCT/CN2021/077464 dated Jun. 9, 2021.
First Office Action of Chinses patent application No. CN202010129422.4 dated Apr. 1, 2022.
First Search Report of Chinses patent application No. CN202010129422.4 dated Mar. 28, 2022.
(Continued)

*Primary Examiner* — Don N Vo

(57) ABSTRACT

The present disclosure provides a method and a device for Relay wireless communications. A first node receives a first signaling, and the first signaling indicates first location information and a first communication range; determines a second communication range according to the first location information and the first communication range; and when the second communication range is greater than a first threshold, transmits a second signaling, and the second signaling indicates second location information and the second communication range; wherein the second communication range is smaller than the first communication range, and the first threshold is a value greater than 0, receives first information, and the first information indicates the second location information; determines a first distance according to the first location information and the second location information. In case of limited transmit power, the present disclosure can expand communication range through forwarding by the first node.

20 Claims, 6 Drawing Sheets

(51) Int. Cl.
*H04W 52/28* (2009.01)
*H04W 52/36* (2009.01)

(58) Field of Classification Search
USPC .................................................. 455/456.1
See application file for complete search history.

(56) References Cited

U.S. PATENT DOCUMENTS

| | | | | |
|---|---|---|---|---|
| 2015/0373690 | A1* | 12/2015 | Webb | H04W 72/23 370/330 |
| 2018/0288685 | A1 | 10/2018 | Jung | |
| 2018/0317140 | A1* | 11/2018 | Zhang | H04W 36/03 |
| 2020/0275389 | A1* | 8/2020 | Liu | H04B 17/318 |
| 2021/0007020 | A1* | 1/2021 | Jiang | H04L 5/0051 |

OTHER PUBLICATIONS

Notification to Grant Patent Right for Invention of Chinses patent application No. CN202010129422.4 dated Aug. 1, 2022.
Intel Corporation Sidelink Power Control for Wearable and IoT Use Cases 3GPP TSG RAN WG1 Meeting #89 R1-1707334 May 5, 2017.
Intel Corporation Sidelink Power Control for Wearable and IoT Use Cases 3GPP TSG RAN WG1 Meeting#90 R1-1712520 Aug. 11, 2017.
ASUSTeK Discussion on sidelink physical layer procedure on NR V2X 3GPP TSG RAN WG1 #99 R1-1912906 Nov. 8, 2019.
Nokia, Nokia Shanghai Bell Remaining details of physical layer procedures for sidelink 3GPP TSG-RAN WG1 Meeting #100 R1-2000387 Feb. 15, 2022.

* cited by examiner

METHOD AND DEVICE USED FOR RELAY WIRELESS COMMUNICATION

CROSS REFERENCE TO RELATED APPLICATIONS

This application is a continuation of International Application No. PCT/CN2021/077464, filed Feb. 23, 2021, claims the priority benefit of Chinese Patent Application No. 202010129422.4, filed on Feb. 28, 2020 and the priority benefit of Chinese Patent Application No. 202010116831.0, filed on Feb. 25, 2020, the full disclosure of which is incorporated herein by reference.

BACKGROUND

Technical Field

The present disclosure relates to methods and devices in wireless communication systems, and in particular to a method and a device in Sidelink wireless communications supporting relay transmission.

Related Art

As a multi-hop transmission technology, Relay can increase cell-edge throughput and expand cell coverage. Taking Sidelink transmission in Long Term Evolution (LTE) system as an example, transmission from a User Equipment (UE) to a relay node (RN) is Sidelink radio technology transmission, and transmission from the RN to a base station eNodeB (eNB) is LTE radio technology transmission. The RN is used for data forwarding between the UE and the eNB, which is called Internet Protocol (IP) layer forwarding or layer-3(L3) Relay, while IP layer forwarding brings the problem of high IP overhead.

Application scenarios of future wireless communication systems are becoming increasingly diversified, and different application scenarios have different performance demands on systems. To meet these various performance requirements, 3rd Generation Partner Project (3GPP) Radio Access Network (RAN) #72 Plenary decided to study New Radio (NR), or what is called the Fifth Generation (5G), and later at 3GPP RAN #75 Plenary, a Work Item (WI) was approved to standardize NR. In response to rapid growth of Vehicle-to-Everything (V2X) traffics, the 3GPP also has started standard planning and research work under the framework of NR. A Study Item (SI) standardization work was initiated for NR Sidelink Relay at 3GPP RAN #86 Plenary.

SUMMARY

Inventors find through researches that some traffic and application scenarios of V2X put forward requirements for communication range. In view of the requirements, V2X Groupcast transmission specially designs Hybrid Automatic Repeat request (HARQ) transmission based on non-acknowledgement-only (NACK-only) feedback, that is, if a UE in the communication range doesn't successfully receive, a NACK is fed back, while if the UE successfully receives, the NACK is not fed back; the UE outside the communication range does not make HARQ feedback no matter whether it receives successfully or not. Due to limits such as lack of power of the UE or the interferences to a base station, actual transmit power of the transmitting UE when transmitting a radio signal may not satisfy requirements of the communication range, thus may not satisfy requirements of the traffic.

To address the above problem, the present disclosure provides a solution. It should be noted that though the present disclosure only took the NR V2X scenario for example in the statement above, it is also applicable to other scenarios confronting the same difficulty, including Relay networks, Device-to-Device (D2D) networks, cellular networks, and scenarios supporting half-duplex UE, where similar technical effects can be achieved. Additionally, the adoption of a unified solution for various scenarios, including but not limited to NR V2X and Downlink communications, contributes to the reduction of hardware complexity and costs. If no conflict is incurred, embodiments in the first node in the present disclosure and the characteristics of the embodiments are also applicable to any other node, and vice versa. And the embodiments in the present disclosure and the characteristics in the embodiments can be arbitrarily combined if there is no conflict. Particularly, for interpretations of the terminology, nouns, functions and variants (if not specified) in the present disclosure, refer to definitions given in TS36 series, TS38 series and TS37 series of 3GPP specifications.

The present disclosure provides a method in a first node for wireless communications, comprising:

receiving a first signaling, the first signaling indicating first location information and a first communication range; determining a second communication range according to the first location information and the first communication range; and when the second communication range is greater than a first threshold, transmitting a second signaling, the second signaling indicating second location information and the second communication range;

herein, the second communication range is smaller than the first communication range, and the first threshold is a value greater than 0.

In one embodiment, the first location information and the second location information respectively comprise part or all of bits in a zone identifier (ID), and the zone ID indicates a geographic zone.

In one embodiment, the geographic zone is determined by a length and a width of the zone.

In one subembodiment of the above embodiment, the length and the width of the zone are configured by an RRC signaling.

In one embodiment, the zone ID is determined by a total zone number.

In one subembodiment of the above embodiment, the total zone number is configured by an RRC signaling.

In one embodiment, the zone ID can be determined according to the formula in 3GPP TS 36.331 protocol, section 5.10.13.2.

In one embodiment, the zone and the zone ID are used for determining user's location in Sidelink communications.

In one embodiment, the first location information and the second location information respectively comprise part or all of coordinate information.

In one embodiment, the second communication range is smaller than the first communication range, which leads to that a communication range of the second signaling is smaller than a communication range of the first signaling, in the case of limited transmit power, through forwarding of the first node, the possibility of meeting requirements of communication range can be increased, and the transmission requirements of traffic with communication range requirements are satisfied.

Specifically, according to one aspect of the present disclosure, the above method is characterized in comprising:
receiving first information, the first information indicating the second location information; and determining a first instance according to the first location information and the second location information;
herein, the second communication range is determined by a difference value of the first communication range minus the first distance.

In one embodiment, through the first location information and the second location information indicated by the first signaling, the first distance between a transmitter transmitting the first signaling and the first node can be acquired, so that communication range requirements of the second signaling can be acquired, the second communication range is smaller than the first communication range, in the case of limited transmit power, the possibility of meeting requirements of communication range can be increased.

Specifically, according to one aspect of the present disclosure, the above method is characterized in comprising:
receiving a first radio signal, recovering a first bit block according to the first radio signal; and
transmitting a second radio signal;
herein, the first bit block is used for generating the second radio signal; the first signaling comprises configuration information of the first radio signal; and the second signaling comprises configuration information of the second radio signal.

Specifically, according to one aspect of the present disclosure, the above method is characterized in comprising:
receiving second information, the second information indicating maximum transmit power; and
transmitting the second signaling with first transmit power;
herein, the first transmit power is not greater than the maximum transmit power.

Specifically, according to one aspect of the present disclosure, the above method is characterized in comprising:
transmitting the second radio signal with second transmit power;
herein, the second transmit power is not greater than the maximum transmit power.

Specifically, according to one aspect of the present disclosure, the above method is characterized in comprising:
determining third transmit power according to a Downlink pathloss of the first node;
herein, the first transmit power is a smaller one of the third transmit power and the maximum transmit power.

Specifically, according to one aspect of the present disclosure, the above method is characterized in comprising:
determining fourth transmit power according to a Downlink pathloss of the first node;
herein, the second transmit power is a smaller one of the fourth transmit power and the maximum transmit power.

Specifically, according to one aspect of the present disclosure, the above method is characterized in comprising:
when the received first radio signal is a first transmission of the first bit block, and the first radio signal is not successfully decoded, transmitting a NACK.

The present disclosure provides a method in a second node for wireless communications, comprising:
transmitting a first signaling, the first signaling indicating first location information and a first communication range; the first location information and the first communication range being used for determining a second communication range;
herein, the second communication range is used for determining whether a second signaling is transmitted, and the second signaling indicates second location information and the second communication range.

Specifically, according to one aspect of the present disclosure, the above method is characterized in comprising:
the first location information and the second location information being used for determining a first distance;
herein, the second communication range is determined by a difference value of the first communication range minus the first distance.

Specifically, according to one aspect of the present disclosure, the above method is characterized in comprising:
transmitting a first radio signal;
herein, a first bit block is used for generating the first radio signal, the first signaling comprises configuration information of the first radio signal; a first bit block is used for generating the second radio signal, and the second signaling comprises configuration information of the second radio signal.

Specifically, according to one aspect of the present disclosure, the above method is characterized in comprising:
first transmit power being used for transmitting the second signaling;
herein, the first transmit power is not greater than maximum transmit power, and the maximum transmit power is used for indicating maximum allowable transmit power.

Specifically, according to one aspect of the present disclosure, the above method is characterized in comprising:
second transmit power being used for transmitting the second radio signal;
herein, the second transmit power is not greater than the maximum transmit power.

Specifically, according to one aspect of the present disclosure, the above method is characterized in comprising:
a Downlink pathloss being used for determining third transmit power for transmitting the second signaling;
herein, the first transmit power is a smaller one of the third transmit power and the maximum transmit power.

Specifically, according to one aspect of the present disclosure, the above method is characterized in comprising:
a Downlink pathloss being used for determining fourth transmit power for transmitting the second radio signal;
herein, the second transmit power is a smaller one of the fourth transmit power and the maximum transmit power.

Specifically, according to one aspect of the present disclosure, the above method is characterized in comprising:
when the transmitted first radio signal is a first transmission of the first bit block, monitoring a NACK.

The present disclosure provides a first node for wireless communications, comprising:
a first receiver, receiving a first signaling, the first signaling indicating first location information and a first communication range; determining a second communication range according to the first location information and the first communication range; and
a first transmitter, when the second communication range is greater than a first threshold, transmitting a second signaling, the second signaling indicating second location information and the second communication range;

herein, the second communication range is smaller than the first communication range, and the first threshold is a value greater than 0.

The present disclosure provides a second node for wireless communications, comprising:

a third transmitter, transmitting a first signaling, the first signaling indicating first location information and a first communication range; and the first location information and the first communication range being used for determining a second communication range;

herein, the second communication range is used for determining whether a second signaling is transmitted, and the second signaling indicates second location information and the second communication range.

In one embodiment, the method in the present disclosure is advantageous in the following aspects:

by adopting the methods in the present disclosure, through transmitting location information and communication range information, a transmitting UE enables a receiving UE to act as a relay node to forward the successfully received information, which expands communication range in the case of limited UE's transmit power, thus satisfying transmission requirements of traffic with communication range requirements.

the methods in the present disclosure can reduce UE's transmit power when satisfying communication range requirements, so as to achieve the advantage of saving power.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
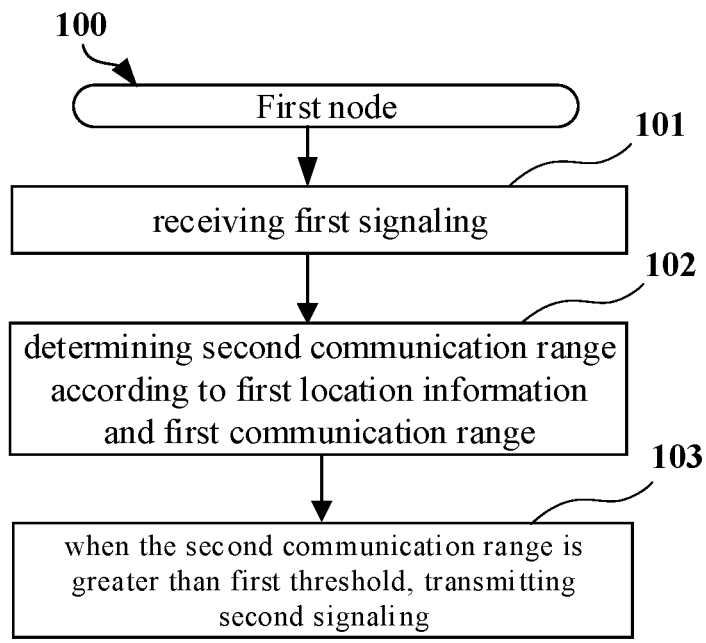
FIG. 1 illustrates a flowchart of a first signaling, first location information, a first communication range, a second communication range and a second signaling according to one embodiment of the present disclosure.

Embodiment 1 illustrates a flowchart of a first signaling, first location information, a first communication range, a second communication range and a second signaling according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, a first node 100 in the present disclosure receives a first signaling in step 101, and the first signaling indicates first location information and a first communication range; determines a second communication range according to the first location information and the first communication range in step 102; and in step 103, when the second communication range is greater than a first threshold, transmits a second signaling, and the second signaling indicates second location information and the second communication range.

In one embodiment, the first signaling is transmitted by the second node in the present disclosure to the first node.

In one embodiment, the second signaling is transmitted by the first node in the present disclosure to a node other than the second node.

In one embodiment, the first signaling is a Downlink signaling.

In one embodiment, the first signaling and the second signaling are respectively a Sidelink signaling.

In one embodiment, the first signaling and the second signaling are respectively a physical-layer signaling.

In one embodiment, formats of the first signaling and the second signaling are respectively Sidelink Control Information (SCI) format 0.

In one embodiment, formats of the first signaling and the second signaling are respectively SCI format 1.

In one embodiment, the first signaling and the second signaling are respectively transmitted on PC5 interface.

In one embodiment, the first signaling and the second signaling are respectively transmitted on a Sidelink.

In one embodiment, the first signaling and the second signaling respectively can comprise a piece of SCI.

In one subembodiment of the above embodiment, the SCI is transmitted on a Physical Sidelink Control CHannel (PSCCH).

In one embodiment, when SCI comprises 2-stage SCI, the first signaling and the second signaling respectively comprise 2nd stage SCI.

In one subembodiment of the above embodiment, the second signaling occupies partial resources of a Physical Sidelink Shared CHannel (PSSCH) for transmission.

In one embodiment, the first communication range belongs to a first communication range set, the first communication range set comprises K communication range(s), K being a positive integer; herein, each communication range in the first communication range set can be indicated by a communication range index of $\lceil \log_2^K \rceil$ bit(s), herein, $\lceil . \rceil$ represents rounding up operation.

In one subembodiment of the above embodiment, K communication range(s) in the first communication range set respectively corresponds (correspond) to the K communication range index(es).

In one embodiment, the first communication range is one of K communication range(s) in the first communication range set.

In one embodiment, the phrase that the first signaling indicates the first communication range includes: the first signaling comprises a first communication range index, and the first communication range index indicates the first communication range.

In one embodiment, the second communication range belongs to a second communication range set, and the second communication range set comprises L communication range(s), L being a positive integer; herein, each communication range in the second communication range set can be indicated by a communication range index of $\lceil \log_2^L \rceil$ bit(s), herein, $\lceil . \rceil$ represents rounding up operation.

In one subembodiment of the above embodiment, L communication range(s) in the second communication range set respectively corresponds (correspond) to the L communication range index(es).

In one embodiment, the second communication range is one of L communication range(s) in the second communication range set.

In one embodiment, the phrase that the second signaling indicates the second communication range includes: the second signaling comprises a second communication range index, and the second communication range index indicates the second communication range.

In one embodiment, the first communication range set and the second communication range set can be a same one.

In one embodiment, the first communication range set and the second communication range set have partial intersection.

In one embodiment, the first communication range set and the second communication range set do not have intersection.

In one embodiment, the first communication range set is a subset of the second communication range subset.

In one embodiment, the second communication range set is a subset of the first communication range set.

In one embodiment, the first communication range set and the second communication range set are respectively pre-configured.

In one embodiment, the first communication range set and the second communication range set are respectively configured by third information.

In one subembodiment of the above embodiment, the third information is a Downlink Radio Resource Control (RRC) layer signaling.

In one subembodiment of the above embodiment, the third information is an Sidelink RRC-layer signaling.

In one subembodiment of the above embodiment, the third information comprises all or partial IEs in an RRC signaling.

In one subembodiment of the above embodiment, the third information comprises all or partial fields in an IE in an RRC signaling.

In one subembodiment of the above embodiment, the third information comprises all or partial IEs in a piece of System Information Block (SIB) information.

In one subembodiment of the above embodiment, the third information comprises all or partial fields in an IE in a piece of SIB information.

In one subembodiment of the above embodiment, the third information is UE group-specific information.

In one subembodiment of the above embodiment, the third information is transmitted through a Downlink Shared Channel (DL-SCH).

In one subembodiment of the above embodiment, the third information is transmitted through a Physical Downlink Shared Channel (PDSCH).

In one subembodiment of the above embodiment, the third information is transmitted through a Sidelink Shared Channel (SL-SCH).

In one subembodiment of the above embodiment, the third information is transmitted through a P S SCH.

In one subembodiment of the above embodiment, the first threshold is indicated by the third information.

Embodiment 2

Figure 2:
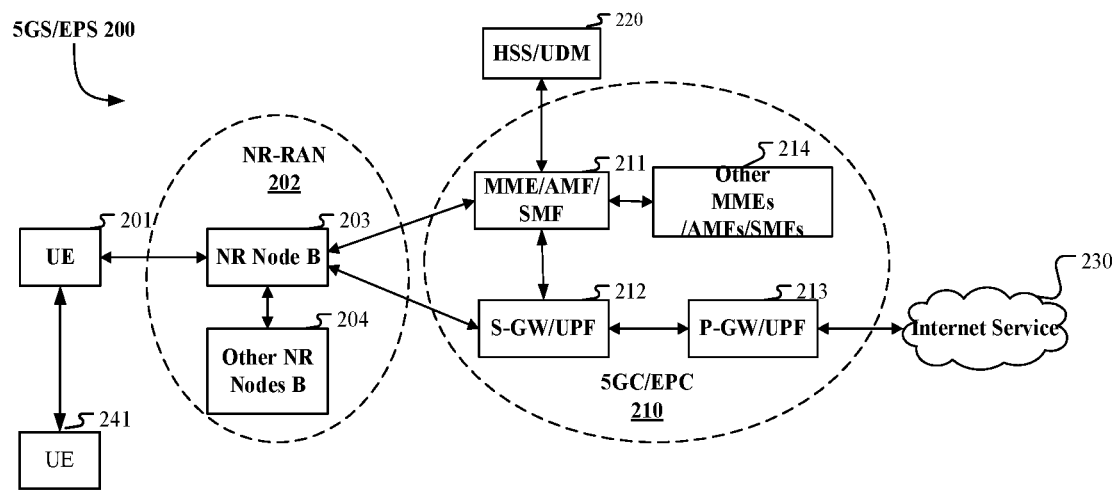
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. In NTN network, the gNB 203 may be a satellite, a aircraft or a territorial base station relayed through a satellite. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, vehicle equipment, On-board communication unit, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports Sidelink communications.

In one embodiment, the UE 201 supports a PC5 interface.

In one embodiment, the UE 201 supports Internet of Vehicles.

In one embodiment, the UE 201 supports V2X traffic.

In one embodiment, the UE 201 corresponds to the second node in the present disclosure.

In one embodiment, the gNB 203 corresponds to the second node in the present disclosure.

In one embodiment, the gNB 203 supports Internet of Vehicles.

In one embodiment, the gNB 203 supports V2X traffic.

In one embodiment, the gNB 203 is a Marco Cell base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay difference.

In one embodiment, the gNB 203 is a flight platform.

In one embodiment, the gNB 203 is satellite equipment.

In one embodiment, a wireless link between the UE 201 to gNB 203 is an Uplink.

In one embodiment, a wireless link between gNB 203 to UE 201 is a Downlink.

In one embodiment, a radio link between the UE 201 and the UE 241 corresponds to a Sidelink in the present disclosure.

In one embodiment, the UE 201 supports Relay transmission.

In one embodiment, the UE 241 supports Relay transmission.

Embodiment 3

Figure 3:
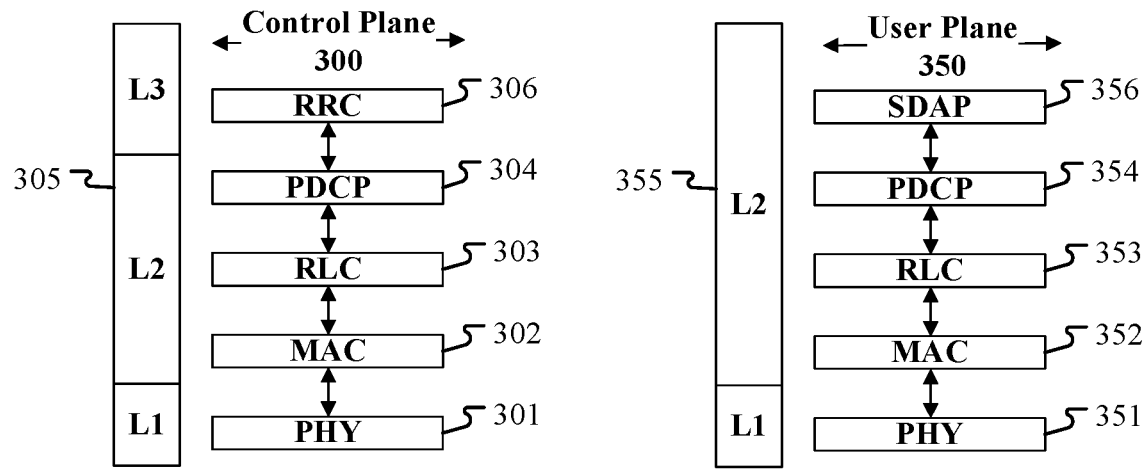
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE or RSU in V2X, vehicle equipment or On-Board Communication Unit) and a second node (gNB, UE or RSU in V2X, vehicle equipment or On-Board Communication Unit), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes. The PDCP sublayer 304 provides data encryption and integrity protection and provides support for handover of a first node between second nodes. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel. The MAC sublayer 302 is also responsible for allocating between first nodes various radio resources (i.e., resource block) in a cell. The MAC sublayer 302 is also in charge of HARQ operation. In the control plane 300, the RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

In one embodiment, the second information in the present disclosure is generated by the RRC 306.

In one embodiment, the second information in the present disclosure is generated by the MAC 302 or the MAC 352.

In one embodiment, the second information in the present disclosure is generated by the PHY 301 or the PHY 351.

In one embodiment, the first signaling in the present disclosure is generated by the PHY 301 or the PHY 351.

In one embodiment, the second signaling in the present disclosure is generated by the PHY 301 or the PHY 351.

In one embodiment, the first radio signal in the present disclosure is generated by the PHY 301 or the PHY 351.

In one embodiment, the second radio signal in the present disclosure is generated by the PHY 301 or the PHY 351.

In one embodiment, the L2 layer 305 or 355 belongs to a higher layer.

In one embodiment, the L3 layer RRC sublayer 306 belongs to a higher layer.

In one embodiment, the radio protocol architecture in FIG. 3 is applicable to the first node in the present disclosure.

In one embodiment, the radio protocol architecture in FIG. 3 is applicable to the second node in the present disclosure.

Embodiment 4

Figure 4:
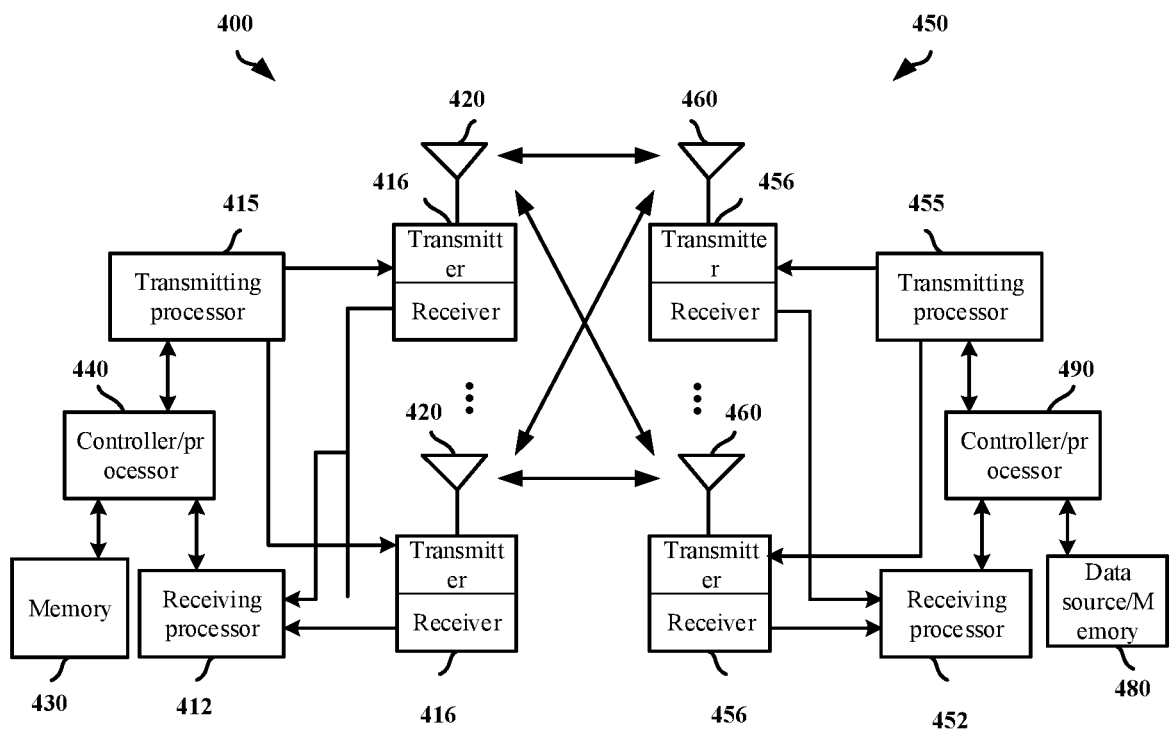
FIG. 4 illustrates a schematic diagram of a first node and a second node according to one embodiment of the present disclosure.

Embodiment 4 illustrates a schematic diagram of a first node and a second node according to the present disclosure, as shown in FIG. 4.

The first node (450) may comprise a controller/processor 490, a receiving processor 452, a transmitting processor 455, a transmitter/receiver 456 and a data source/memory 480, wherein the transmitter/receiver 456 comprises an antenna 460.

The second node (400) may comprise a controller/processor 440, a receiving processor 412, a transmitting processor 415, a transmitter/receiver 416, and a memory 430, wherein the transmitter/receiver 416 comprises an antenna 420.

In a transmission from the second node 400 to the first node 450, at the second node 400, a higher layer packet is provided to the controller/processor 440. The controller/processor 440 implements the functionality of the L2 layer and the higher layer. In a transmission from the second node 400 to the first node 450, the controller/processor 440 provides header compression, encryption, packet segmentation and reordering, and multiplexing between a logical channel and a transport channel, and radio resource allocation of the first node 450 based on various priorities. The controller/processor 440 is also in charge of HARQ operation, retransmission of a lost packet, and a signaling to the first node 450. The transmitter processor 415 implements various signal processing functions of the L1 layer (that is, PHY), including coding, interleaving, scrambling, modulation, power control/allocation, precoding and generation of physical layer control signaling. Modulated signals are divided into parallel streams and each stream is mapped onto corresponding multicarrier subcarriers and/or multicarrier symbols, which are then mapped from the transmitting processor 415 to the antenna 420 via the transmitter 416 to be transmitted in the form of RF signals.

In the transmission from the second node 400 to the first node 450, at the first node 450, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving processing functions include reception of physical layer signals, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the second node 410 on a physical channel, and the data or control signals are later provided to the controller/processor 490. The controller/processor 490 implements the functionality of the L2 layer and the higher layer. The controller/processor can be connected to a memory 480 that stores program code and data. The data source/memory 480 may be called a computer readable medium.

In a transmission from the first node 450 to the second node 400, at the first node 450, the data source/memory 480 provides higher-layer data to the controller/processor 490. The data source/memory 480 represents all protocol layers of the L2 layer and above the L2 layer. The controller/processor 490 performs the L2 layer protocol for the user plane and the control plane by providing header compression, encryption, packet segmentation and reordering, as well as multiplexing between a logic channel and a transport channel through radio resources allocation based on the second node 410. The controller/processor 490 is also in charge of HARQ operation, a retransmission of a lost packet and a signaling to the second node 410. The transmitting processor 455 performs various signal processing functions on the layer L1 (i.e., the physical layer). The signal transmitting processing function comprises performing coding and interleaving so as to ensure a Forward Error Correction (FEC) at the UE 450 side and performing modulation to baseband signals according to each modulation scheme (i.e., BPSK, QPSK, M-PSK, and M-QAM, etc.). Modulated signals are divided into parallel streams and each stream is mapped onto corresponding multicarrier subcarriers and/or multicarrier symbols, which are then mapped from the transmitting processor 415 to the antenna 420 via the transmitter 416 to be transmitted in the form of RF signals.

In the transmission from the first node 450 to the second node 400, at the second node 400, the receiver 416 receives an RF signal via its corresponding antenna 420, and each receiver 416 recovers baseband information modulated to an RF carrier, and supplies the baseband information to the receiving processor 412. The receiving processor 412 performs various signal receiving processing functions of the L1 layer. The signal receiving processing functions include acquisition of multicarrier symbol streams, demodulation of multicarrier symbols in multicarrier symbol streams based on each modulation scheme (e.g., BPSK, QPSK), and then decoding and de-interleaving of the demodulated symbols so as to recover data or control signals transmitted by the first node 450 on a physical channel. The data and the control signal are then provided to the controller/processor 440. The controller/processor 440 implements the functionality of the L2 layer. The controller/processor 440 can be connected to a memory 430 that stores program code and data. The memory 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives a first signaling, and the first signaling indicates first location information and a first communication range; determines a second communication range according to the first location information and the first communication range; and when the second communication range is greater than a first threshold, transmits a second signaling, and the second signaling indicates second location information and the second communication range; herein, the second communication range is smaller than the first communication range, and the first threshold is a value greater than 0.

In one embodiment, the first node 450 comprises a memory that stores a computer readable instruction program. The computer readable instruction program generates an action when executed by at least one processor. The action includes: receiving a first signaling, the first signaling indicating first location information and a first communication range; determining a second communication range according to the first location information and the first communication range; and when the second communication range is greater than a first threshold, transmitting a second signaling, the second signaling indicating second location information and the second communication range; herein, the second communication range is smaller than the first communication range, and the first threshold is a value greater than 0.

In one embodiment, the second node 400 comprises at least one processor and at least one memory. The at least one memory comprises computer program codes; the at least one memory and the computer program codes are configured to be used in collaboration with the at least one processor. The second node 400 at least: transmits a first signaling, and the first signaling indicates first location information and a first communication range; the first location information and the first communication range are used for determining a second communication range; herein, the second communication range is used for determining whether a second signaling is transmitted, and the second signaling indicates second location information and the second communication range.

In one embodiment, the second node 400 comprises a memory that stores a computer readable instruction program. The computer readable instruction program generates an action when executed by at least one processor. The action includes: transmitting a first signaling, the first signaling indicating first location information and a first communication range; the first location information and the first communication range being used for determining a second communication range; herein, the second communication range is used for determining whether a second signaling is transmitted, and the second signaling indicates second location information and the second communication range.

In one embodiment, the first node 450 is a UE.

In one embodiment, the first node 450 is a UE supporting V2X.

In one embodiment, the first node 450 is a UE supporting D2D.

In one embodiment, the first node 450 is vehicle-mounted equipment.

In one embodiment, the first node 450 is an RSU.

In one embodiment, the second node 400 is a base station supporting V2X.

In one embodiment, the second node 400 is a UE.

In one embodiment, the second node 400 is a UE supporting V2X.

In one embodiment, the first node 400 is a UE supporting D2D.

In one embodiment, the second node 400 is vehicle-mounted equipment.

In one embodiment, the second node 400 is an RSU.

In one embodiment, the receiver 456 (including the antenna 460), the receiving processor 452 and the controller/processor 490 are used to receive the first signaling and the first radio signal in the present disclosure.

In one embodiment, the transmitter 416 (including the antenna 420), the transmitting processor 415 and the controller/processor 440 are used to transmit the first signaling and the first radio signal in the present disclosure.

In one embodiment, the transmitter 456 (including the antenna 460), the transmitting processor 455 and the controller/processor 490 are used to transmit the second signaling, the second radio signal and the NACK in the present disclosure.

In one embodiment, the receiver 416 (including the antenna 420), the receiving processor 412 and the controller/processor 440 are used to monitor the NACK in the present disclosure.

Embodiment 5

Figure 5:
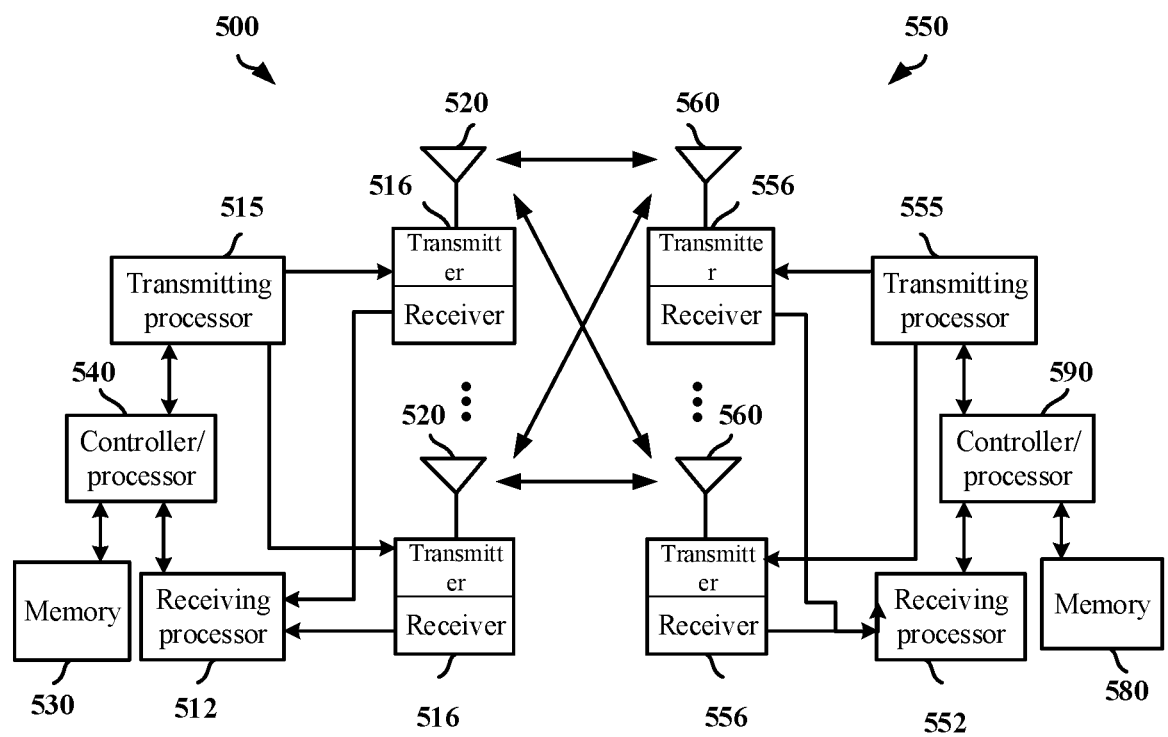
FIG. 5 illustrates a schematic diagram of a first node and a network node according to one embodiment of the present disclosure.

Embodiment 5 illustrates a schematic diagram of a first node and a network node according to the present disclosure, as shown in FIG. 5.

The first node (550) comprises a controller/processor 590, a memory 580, a receiving processor 552, a transmitter/receiver 556 and a transmitting processor 555, wherein the transmitter/receiver 556 comprises an antenna 560.

The network node (500) comprises a controller/processor 540, a memory 530, a receiving processor 512, a transmitter/receiver 516, a transmitting processor 515, wherein the transmitter/receiver 516 comprises an antenna 520.

In a Downlink transmission from the network node 500 to the first node 550, a higher layer packet is provided to the controller/processor 590, and the controller/processor 590 implements the functionality of the L2 layer. In Downlink transmission, the controller/processor 590 provides header compression, encryption, packet segmentation and reordering, and multiplexing between a logical channel and a transport channel. The controller/processor 590 is also in charge of HARQ operation (if supported), a retransmission and a signaling to the UE 500. The transmitting processor 555 implements various signal processing functions of the L1 layer (that is, PHY), including coding, interleaving, scrambling, modulation, power control/allocation, precoding and generation of physical layer control signaling. Modulated symbols are divided into parallel streams and each stream is mapped onto corresponding multicarrier subcarriers and/or multicarrier symbols, which are then mapped from the transmitting processor 555 to the antenna 560 via the transmitter 556 to be transmitted in the form of RF signals. At the receiving side of the first node, each receiver 516 receives an RF signal via a corresponding antenna 520, each receiver 516 recovers baseband information modulated to the RF carrier and provides the baseband information to the receiving processor 512. The receiving processor 512 provides various signal receiving functions for the L1 layer. The signal receiving processing functions include reception of a physical layer signal, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the first communication node 550 on a physical channel, and the data or control signals are later provided to the controller/processor 540. The controller/processor 540 implements processing of the L2 layer and interprets higher layer information. The controller/processor can be connected to a memory 530 that stores program code and data. The memory 530 may be called a computer readable medium.

In one embodiment, the transmitter 516 (including the antenna 520), the transmitting processor 515 and the controller/processor 540 are used to transmit the second information and the third information.

In one embodiment, the receiver 556 (including the antenna 560), the receiving processor 552 and the controller/processor 590 are used to receive the second information and the third information in the present disclosure.

In one embodiment, the network node is a base station.

Embodiment 6

Figure 6:
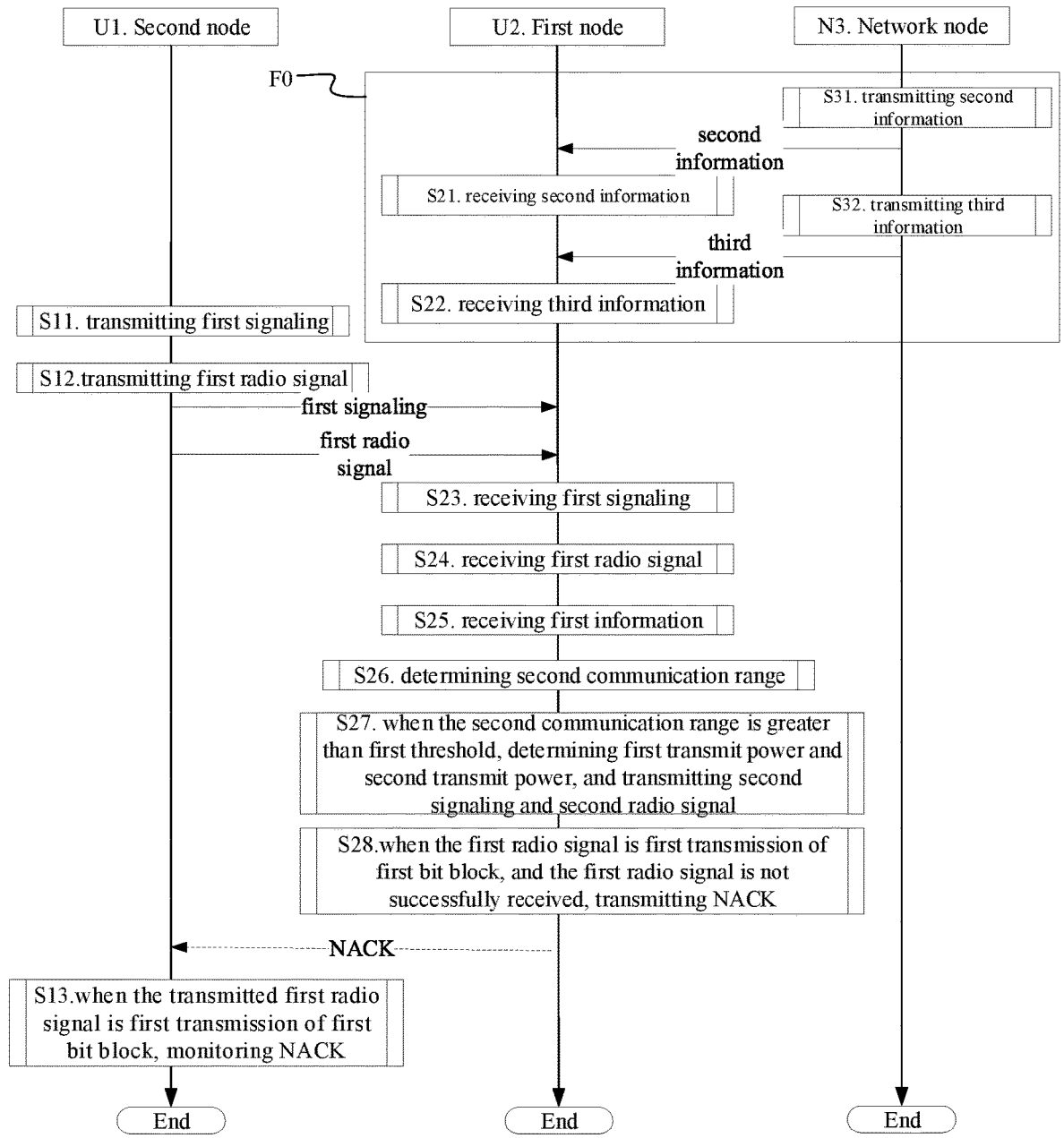
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a second node U1 and a first node U2 are in communications via a Sidelink, and a network node and a first node U2 are in communications via a Downlink. It is particularly underlined that the order illustrated in the embodiment does not put constraints over sequences of signal transmissions and implementations.

The second node U1 transmits a first signaling in step S11, transmits a first radio signal in step S12, and in step S13, when the transmitted first radio signal is a first transmission of a first bit block, monitors a NACK.

The first node U2 receives second information in step S12, receives third information in step S22, receives a first signaling in step S23, receives a first radio signal in step S24, receives first information in step S25, determines a second communication range in step S26, when the second communication range is greater than a first threshold in step S27, determines first transmission power and second transmission power, transmits a second signaling and a second radio signal, and when the first radio signal is a first transmission of a first bit block in step S28, and the first radio signal is not successfully received, transmits a NACK.

The network node N3 transmits second information in step S31, and transmits third information in step S32.

In Embodiment 6, a first signaling is received, and the first signaling indicates first location information and a first communication range; a second communication range is determined according to the first location information and the first communication range; and when the second communication range is greater than a first threshold, a second signaling is transmitted, the second signaling indicates second location information and the second communication range; herein, the second communication range is smaller than the first communication range, and the first threshold is a value greater than 0; first information is received, the first information indicates the second location information; and a first distance is determined according to the first location information and the second location information;

herein, the second communication range is determined by a difference value of the first communication range minus the first distance; a first radio signal is received, a first bit block is recovered according to the first radio signal; a second radio signal is transmitted; herein, the first bit block is used for generating the second radio signal; the first signaling comprises configuration information of the first radio signal; and the second signaling comprises configuration information of the second radio signal; second information is received, the second information indicates maximum transmit power; the second signaling is transmitted with first transmit power; herein, the first transmit power is not greater than the maximum transmit power; the second radio signal is transmitted with second transmit power; herein, the second transmit power is not greater than the maximum transmit power; third transmit power for transmitting the second signaling is determined according to a Downlink pathloss of the first node; herein, the first transmit power is a smaller one of the third transmit power and the maximum transmit power; fourth transmit power for transmitting the second radio signal is determined according to a Downlink pathloss of the first node; herein, the second transmit power is a smaller one of the fourth transmit power and the maximum transmit power; when the received first radio signal is a first transmission of the first bit block, the first radio signal is not successfully decoded, and a NACK is transmitted.

In one embodiment, the first node U2 and the second node U1 are respectively a UE.

In one embodiment, the network node N3 is a base station.

In one embodiment, the first node U2 receives the second information transmitted by the network node N3, and the second information indicates the maximum transmit power.

In one embodiment, the second information comprises configured maximum UE output power ($P_{cmax}$), the $P_{cmax}$ is configured maximum output power, maximum transmit power of the first node is recorded as $P_{max}$ and is set as $P_{cmax}$.

In one embodiment, the second information comprises Channel Busy Ratio (CBR)-based maximum UE output power ($P_{MAX\_CBR}$), the $P_{MAX\_CBR}$ is configured CBR-based maximum output power, and the $P_{MAX\_CBR}$ is related to a priority of the first radio signal and CBR.

In one subembodiment of the above embodiment, maximum transmit power of the first node is a smaller one of $P_{cmax}$ and $P_{MAX\_CBR}$, that is, $P_{max}=\min(P_{cmax}, P_{MAX\_CBR})$, herein, $\min(\cdot)$ is minimum value selection operation.

In one embodiment, the second information is higher-layer information.

In one embodiment, the second information is transmitted internally within the first node.

In one embodiment, the second information is transferred from a higher layer of the first node to a physical layer of the first node.

In one embodiment, the second information is configured.

In one embodiment, the second information is pre-configured.

In one embodiment, the second information is a Downlink signaling.

In one embodiment, the second information is a Downlink RRC layer signaling.

In one embodiment, the second information comprises all or partial IEs of an RRC signaling.

In one embodiment, the second information comprises all or partial fields of an RRC signaling.

In one embodiment, the second information comprises all or partial IEs in a piece of SIB information.

In one embodiment, the second information comprises all or partial fields in an IE in a piece of SIB information.

In one embodiment, the second information is Cell-Specific.

In one embodiment, the second information is a piece of zone-specific information, and the zone is determined by location information of a UE.

In one embodiment, the second information is UE group-specific information.

In one embodiment, the second information is UE-specific information.

In one embodiment, the second information is transmitted through a DL-SCH.

In one embodiment, the second information is transmitted through a PDSCH.

In one embodiment, the second information is Broadcast.

In one embodiment, the second information is Unicast.

In one embodiment, the second information is Groupcast.

In one embodiment, the first node U2 receives the first signaling and the first radio signal transmitted by the first node U1, and the first signaling indicates the first location information and the first communication range.

In one embodiment, the first radio signal and the second radio signal are respectively transmitted on a PSSCH.

In one embodiment, the first radio signal and the second radio signal are respectively transmitted via an air interface.

In one embodiment, the first radio signal and the second radio signal are respectively transmitted via a radio interface.

In one embodiment, the first radio signal and the second radio signal are respectively transmitted via a PC5 interface.

In one embodiment, the first radio signal and the second radio signal are respectively transmitted via a Sidelink.

In one embodiment, the phrase of recovering a first bit block according to the first radio signal includes decoding the first radio signal to obtain the first bit block.

In one embodiment, the phrase of recovering a first bit block according to the first radio signal includes decoding the first radio signal to obtain an information bit block, when Cyclic Redundancy Check (CRC) is passed, judging that the first radio signal is successfully received, and the information bit block is the first bit block.

In one embodiment, the phrase that the first signaling comprises configuration information of the first radio signal includes: the first signaling comprises at least one of a HARQ process ID, a New Data Indicator (NDI), HARQ-ACK resource or a redundancy version, the first signaling does not comprise an indication of time-frequency resources occupied by the first radio signal.

In one embodiment, the first node receives a third signaling, and the third signaling indicates time-frequency resource information occupied by the first radio signal.

In one subembodiment of the above two embodiments, the first signaling and the third signaling are used together for scheduling the first radio signal.

In one embodiment, the phrase that the first signaling comprises configuration information of the first radio signal includes: the first signaling comprises scheduling information of the first radio signal.

In one embodiment, the phrase that the second signaling comprises configuration information of the second radio signal includes: the second signaling comprises at least one of a HARQ process ID, an NDI, HARQ-ACK resource or a redundancy version, and the second signaling does not comprise an indication of time-frequency resources occupied by the second radio signal.

In one embodiment, the first node transmits a fourth signaling, and the fourth signaling indicates time-frequency resource information occupied the second radio signal.

In one subembodiment of the above two embodiments, the second signaling and the fourth signaling are used together for scheduling the second radio signal.

In one subembodiment of the above two embodiments, the time-frequency resources occupied by the second radio signal comprises multiple Resource Elements (REs).

In one subembodiment of the above two embodiments, the time-frequency resources occupied by the second radio signal comprises one or more multicarrier symbols.

In one embodiment, the multicarrier symbol is an Orthogonal Frequency Division Multiplexing (OFDM) symbol.

In one embodiment, the multicarrier symbol is a Single-Carrier Frequency-Division Multiple Access (SC-FDMA) symbol.

In one embodiment, the multi-carrier symbol is a Filter Bank Multicarrier (FBMC) symbol.

In one embodiment, the phrase that the second signaling comprises configuration information of the second radio signal includes: the second signaling comprises scheduling information of the second radio signal.

In one embodiment, the first node U2 transmits the second signaling and the second radio signal, target receivers of the second signaling and the second radio signal are receivers other than the second node in the present disclosure.

In one embodiment, all or partial bits of the 2nd stage SCI are used for generating the second signaling.

In one embodiment, all or partial bits of the 2nd stage SCI are used for generating the second signaling.

In one embodiment, all or partial bits of the 2nd stage SCI and a reference signal are used for generating the second signaling.

In one embodiment, all or partial bits in payload of the 2nd stage SCI acquire the second signaling sequentially through CRC Calculation, Channel Coding, Rate Matching, Scrambling, Modulation, Mapping to Physical Resources, OFDM Baseband Signal Generation, and Modulation and Upconversion.

In one embodiment, all or part of the first bit block are used for generating the second radio signal.

In one embodiment, all or part of the first bit block and a reference signal are used for generating the second radio signal.

In one embodiment, all or partial bits in a first bit block acquire the second radio signal sequentially through CRC Calculation, Channel Coding, Rate matching, Scrambling, Modulation, Layer Mapping, Antenna Port Mapping, Mapping to Virtual Resource Blocks, Mapping from Virtual to Physical Resource Blocks, OFDM Baseband Signal Generation, Modulation and Upconversion.

In one embodiment, all or partial bits in a payload of SCI acquire the second radio signal sequentially through CRC Calculation, Channel Coding, Rate Matching, Scrambling, Modulation, Mapping to Physical Resources, OFDM Baseband Signal Generation, and Modulation and Upconversion.

In one embodiment, the first bit block is transmitted on an SL-SCH.

In one embodiment, the first information is higher-layer information.

In one embodiment, the first information is transmitted internally within the first node in the present disclosure.

In one embodiment, the first information is transferred from a higher layer of the first node to a physical layer of the first node.

In one embodiment, the first information comprises coordinate information of geographic location of the first node.

In one embodiment, the first location information indicates geographic location of the second node.

In one embodiment, the second location information indicates geographic location of the first node.

In one embodiment, the first distance is a distance between the first node and the second node acquired according to the first location information and the second location information.

In one subembodiment of the embodiment, when the first location information and the second location information indicates a coordinate, the first distance is $\sqrt{(x1-x2)^2+(y1-y2)^2}$, herein, the (x1,y1) is part or all of information of the geographic location coordinate of the second node, and the (x2,y2) is part or all of information of the geographic location coordinate of the first node.

In one subembodiment of the embodiment, when the first location information and the second location information indicate a zone ID, the first distance is $\sqrt{(x1-x2)^2+(y1-y2)^2}$, herein, the (x1,y1) is part or all of information of a coordinate of a central geographic location of a zone where the second node is located, and the (x2,y2) is part or all of information of a coordinate of a central geographic location of a zone where the first node is located.

In one subembodiment of the embodiment, when the first location information and the second location information indicate a zone ID, the first distance is $\sqrt{(x1-x2)^2+(y1-y2)^2}$, herein, the (x1, y1) is part or all of information of a coordinate of a central geographic location of a zone closest to the first node indicated by a zone ID, and the (x2, y2) is part or all of information of the geographic location coordinate of the first node, herein, the geographic location coordinate of the first node is used for determining the zone ID of the first node.

In one embodiment, when the first location information and the second location information indicate a zone ID, the first distance is $\sqrt{(x1-x2)^2+(y1-y2)^2}$, herein, the (x1, y1) is part or all of information of a geographic location coordinate of a zone closest to the first node indicated by a zone ID, and the (x2, y2) is part or all of information of the geographic location coordinate of the first node, herein, the geographic location coordinate of the first node is used for determining the zone ID of the first node; and a geographic location of a zone closest to the first node indicated by a zone ID satisfies a geographic location with a shortest distance to the first node.

In one embodiment, the phrase that the second communication range is determined by a difference value of the first communication range minus the first distance includes: a remaining range Z is acquired by subtracting the first distance from the first communication range, and the second communication range is determined according to the remaining communication range Z.

In one subembodiment of the above embodiment, the second communication range value is the remaining communication range Z.

In one subembodiment of the above embodiment, when a value of the Z satisfies X<Z≤Y, a value of the second communication range is Y, herein, X and Y are respectively two values in the second communication range set.

In one subembodiment of the above embodiment, when a value of the Z satisfies X≤Z<Y, a value of the second communication range is X, herein, X and Y are respectively two values in the second communication range set.

In one subembodiment of the above embodiment, when a value of the Z satisfies X<Z<Y and |Z−X|>|Y−Z| at the same time, wherein 1.1 is signed magnitude arithmetic, a value of the second communication range is Y, herein, X and Y are respectively two values in the second communication range set.

In one subembodiment of the above embodiment, when a value of the Z satisfies X<Z<Y and |Z−X|<|Y−Z| at the same time, wherein 1.1 is signed magnitude arithmetic, a value of the second communication range is X, herein, X and Y are respectively two values in the second communication range set.

In one subembodiment of the above embodiment, when a value of the Z satisfies X<Z<Y and |Z−X|=|Y−Z| at the same time, wherein |·| is signed magnitude arithmetic, a value of the second communication range is Y, herein, X and Y are respectively two values in the second communication range set.

In one subembodiment of the above embodiment, when a value of the Z satisfies X<Z<Y and |Z−X|=|Y−Z| at the same time, wherein 1.1 is signed magnitude arithmetic, a value of the second communication range is X, herein, X and Y are respectively two values in the second communication range set.

In one subembodiment of the above embodiment, when a value of the Z satisfies Z<X and Z is greater than and equal to the first threshold, herein, a value of the second communication range is X, wherein X is a minimum value in the second communication range set.

In one subembodiment of the above embodiment, when a value of the Z satisfies Z>Y, a value of the second communication range is Y, herein, Y is a maximum value in the second communication range set.

In one embodiment, when the second communication range is smaller than the first threshold, transmission of the second signaling is dropped.

In one embodiment, Power Spectrum Density (PSD) of the first transmit power is the same as PSD of the second transmit power, and the PSD is transmit power on each RE.

In one embodiment, transmit power on each RE occupied by the second signaling is the same as transmit power on each RE occupied by the second radio signal.

In one embodiment, PSD of the first transmit power is Q time(s) of the second transmit power, Q being a pre-configured value.

In one embodiment, transmit power on each RE occupied by the second signaling is Q time(s) of transmit power on each RE occupied by the second radio signal, Q being a pre-configured value.

In one embodiment, PSD of the first transmit power is twice of PSD of the second transmit power.

In one embodiment, transmit power on each RE occupied by the second signaling is twice of transmit power on each RE occupied by the second radio signal.

In one embodiment, the first transmit power, recorded as $P_{1\_C}$, is maximum transmit power of the first node, that is, $P_{1\_C}=P_{max}$.

In one embodiment, the second transmit power, recorded as $P_{2\_D}$, is maximum transmit power of the first node, that is, $P_{2\_D}=P_{max}$.

In one embodiment, the first node estimates Downlink pathloss ($PL_D$) according to measured Reference Signal Received Power (RSRP) of a reference signal transmitted by a base station, and the base station is a serving base station of the first node.

In one subembodiment of the above embodiment, the reference signal is Downlink Channel State Information-Reference Signal (CSI-RS).

In one subembodiment of the above embodiment, the reference signal is a Downlink Synchronization Signal (SS).

In one subembodiment of the above embodiment, the reference signal is a Downlink Common Reference Signal (CRS).

In one embodiment, the third transmit power, recorded as $P_{3\_C}$, can be determined by a formula for calculating $P_{PSCCH,D}$ in 3GPP 38.213 protocol, section 16.2, and the $P_{3\_C}$ is related to a frequency-domain bandwidth of the second signaling.

In one embodiment, when PSD of the first transmit power is the same as PSD of the second transmit power, the third transmit power $P_{3\_C}(i)=P_{O,D}+10\ \log_{10}\ (2^{\mu}\cdot M_{RB}^{C}(i))+\alpha_{D}+PL_{D}$ [dBm], herein, the $P_{O,D}$ and the $\alpha_{D}$ are indicated by the second information, the $M^{C}_{RB}$ is a number of Resource Block(s) (RB) of frequency-domain resources occupied by the second signaling, the $\mu$ is related to a subcarrier spacing (SCS) of a PSCCH, the i is slot number of transmission, the $\log_{10}$ (·) is base-10 logarithmic operation, and the decibel relative to one milliwatt (dBm) is a unit for measurement of transmit power.

In one embodiment, when PSD of the first transmit power is twice of PSD of the second transmit power, the third transmit power $P_{3\_C}$ is determined by the formula $$P_{3\_C}(i) = P_{O,D} + 10\ \log_{10}\left(10^{\frac{3}{10}} \cdot 2^{\mu} \cdot M_{RB}^{C}(i)\right) + \alpha_D + PL_D\ \text{[dBm]},$$

and the $M_{RB}^{C}$ is a number of RB(s) of frequency-domain resources occupied by the second signaling.

In one embodiment, the fourth transmit power $P_{4\_D}$ can be determined the formula for calculating $P_{PSSCH,D}$ in 3GPP 38.213 protocol, section 16.2, that is, $P_{4\_D}(i)=P_{O,D}+10\ \log_{10}\ (2^{\mu}\cdot M_{RB}^{D}(i))+\alpha_{D}+PL_{D}$ [dBm], herein, the $M_{RB}^{D}$ is a number of RB(s) of frequency-domain resources occupied by the second radio signal.

In one embodiment, the phrase that the first transmit power is a smaller one of the third transmit power and the maximum transmit power includes: the first transmit power $P_{1\_C}$ is a smaller one of maximum transmit power of the first node and the third transmit power, that is, $P_{1\_C}=\min(P_{max}, P_{3\_C})$, herein, the min(·) is minimum value selection operation.

In one embodiment, the phrase that the second transmit power is a smaller one of the fourth transmit power and the maximum transmit power includes: the second transmit power $P_{2\_D}$ is a smaller one of maximum transmit power of the first node and the fourth transmit power, that is, $P_{2\_D}=\min(P_{max}, P_{4\_D})$, herein, the min(·) is minimum value selection operation.

In one embodiment, the first node estimates SL pathloss ($PL_{SL}$) according to the remaining communication range.

In one embodiment, the first node estimates $PL_{SL}$ according to the second communication range.

In one subembodiment of the above two embodiments, the $PL_{SL}$ can be estimated by the formula of Internet of Vehicles (IoT) pathloss.

In one subembodiment of the above two embodiments, in free space, the $PL_{SL}$ can be estimated by the formula of $PL_{SL}=32.44+20\ \lg(d)+20\ \lg(f)+30$, herein, the $PL_{SL}$ is sidelink pathloss, which is measured by dBm, the distance(d) is the remaining communication range, which is measured by km, the f is frequency, which is measured by Mega Hertz (MGz), and the lg(·) is base-10 logarithm operation.

In one embodiment, fifth transmit power of the second signaling is determined according to $PL_{SL}$ of the first node; herein, the first transmit power is a smaller one of the fifth transmit power and the maximum transmit power.

In one embodiment, sixth transmit power of the second radio signal is determined according to $PL_{SL}$ of the first node; herein, the second transmit power is a smaller one of the sixth transmit power and the maximum transmit power.

In one embodiment, the first node estimates $PL_{SL}$ according to RSRP of Sidelink.

In one subembodiment of the above embodiment, the reference signal is a Sidelink CSI-RS.

In one subembodiment of the above embodiment, the reference signal is a Sidelink SS.

In one embodiment, the fifth transmit power, recorded as $P_{5\_C}$, can be determined by a formula for calculating $P_{PSCCH,SL}$ in 3GPP 38.213 protocol, section 16.2, and the fifth transmit power is related to a frequency-domain bandwidth of the second signaling.

In one embodiment, when PSD of the first transmit power is the same as PSD of the second transmit power, the fifth transmit power $P_{5\_C}(i)=P_{O,SL}+10\ \log_{10}(2^{\mu}\cdot M_{RB}^{C}(i))+\alpha_{SL}+PL_{SL}$ [dBm], herein, the $P_{O,SL}$ and the $a_{SL}$ are indicated by the second information, the $M_{RB}^{C}$ is a number of RB(s) of frequency-domain resources occupied by the second signaling, the $\mu$ is related to an SCS of a PSCCH channel, the i is a slot number of transmission, the $\log_{10}$(·) is base-10 logarithm operation, and the dBm is a unit for measurement of transmit power.

In one embodiment, when PSD of the first transmit power is twice of PSD of the second transmit power, the fifth transmit power is determined by the formula of $$P_{5\_C}(i) = P_{O,SL} + 10\ \log_{10}\left(10^{\frac{3}{10}} \cdot 2^{\mu} \cdot M_{RB}^{C}(i)\right) + \alpha_{SL} + PL_{SL}\ \text{[dBm]}.$$

In one embodiment, the sixth transmit power $P_{6\_D}$ can be determined the formula of calculating $P_{PSSCH,SL}$ in 3GPP 38.213 protocol, section 16.2, that is, $P_{6\_D}=P_{O,SL}+10\ \log_{10}(2^{\mu}\cdot$ (i)$))+\alpha_{SL}+PL_{SL}$ [dBm] herein, the $M_{RB}^{D}$ is a number of RB(s) of frequency-domain resources occupied by the second radio signal.

In one embodiment, the first transmit power $P_{1\_C}$ is a smaller one of maximum transmit power of the first node and the fifth transmit power, that is, $P_{1\_C}=\min(P_{max}, P_{5\_C})$.

In one embodiment, the second transmit power $P_{2\_D}$ is a smaller one of maximum transmit power of the first node and the sixth transmit power, that is, $P_{2\_D}=\min(P_{max}, P_{6\_D})$.

In one embodiment, the first transmit power $P_{1\_C}$ is a smallest one among maximum transmit power of the first node, the third transmit power and the fifth transmit power, that is, $P_{1\_C}=\min(P_{max}, P_{3\_C}, P_{5\_C})$.

In one embodiment, the second transmit power is a smallest one among maximum transmit power of the first node, the fourth transmit power and the sixth transmit power, that is, $P_{2\_D}=\min(P_{max}, P_{4\_D}, P_{6\_D})$.

In one embodiment, when HARQ is enabled, the first radio signal is a first transmission of the first bit block, and the first radio signal is not successfully received, the first node U2 transmits a NACK to the second node U1.

In one embodiment, the phrase that the first radio signal is a first transmission of the first bit block includes: the first radio signal is a first transmission of the first bit block.

In one embodiment, the phrase that the first radio signal is a first transmission of the first bit block includes: when maximum M relay transmission(s) is configured to be allowable, the first bit block is transmitted in a first transmission occasion of M relay transmission occasion(s).

In one embodiment, the first signaling indicates relay transmission times.

In one subembodiment of the above embodiment, when a value of the relay transmission time(s) is a relay transmission threshold, the first radio signal is indicated to be a first transmission of the first bit block, and the relay transmission threshold is indicated by the third information.

In one subembodiment of the above embodiment, updated relay transmission time(s) is(are) acquired by subtracting the relay transmission time(s) by 1, when a value of the updated relay transmission time(s) is greater than 0, the updated relay transmission time(s) is(are) indicated in the second signaling; when the updated relay transmission time is not greater than 0, transmission of the second signaling is dropped.

In one embodiment, the first signaling indicates a relay transmission identifier.

In one subembodiment of the above embodiment, when the relay transmission identifier is set as 1, the first radio signal is indicated to be first transmission of the first bit block, and the relay transmission identifier is set as 0 in the second signaling.

In one subembodiment of the above embodiment, when the relay transmission identifier is set as 0, transmission of the second signaling is dropped.

In one embodiment, channel decoding is performed in time-frequency resources scheduled by the first signaling, and whether the channel decoding is correct is judged according to CRC.

In one subembodiment of the above embodiment, if CRC is failed to be passed, the first radio signal is not successfully received; and if CRC is passed, the first radio signal is successfully received.

Embodiment 7

Figures 7, 8:
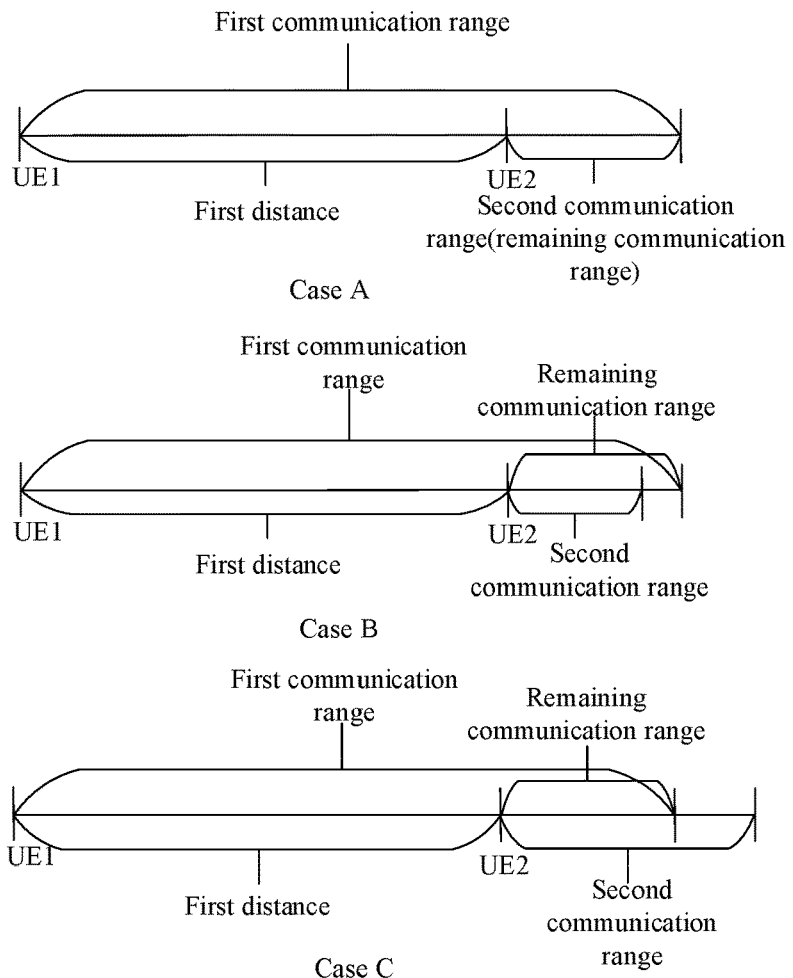
FIG. 7 illustrates a schematic diagram of a first communication range, a first distance, a remaining communication range and a second communication range according to one embodiment of the present disclosure.
FIG. 8 illustrates a structure schematic diagram of first location information in 2nd stage SCI and a first communication range according to one embodiment of the present disclosure.

Embodiment 7 illustrates a schematic diagram a first communication range, a first distance, a remaining communication range and a second communication range according to one embodiment of the present disclosure, as shown in FIG. 7.

In case A of Embodiment 7, the remaining communication range is one in the second communication range set, at this time, the second communication range is the remaining communication range.

In case B and case C of Embodiment 7, the remaining communication range is not comprised in the second communication range set, at this time, the second communication range can select a value closest to the remaining communication range in the second communication range set.

In case B of Embodiment 7, the second communication range is smaller than the remaining communication range.

In case C of Embodiment 7, the second communication range is greater than the remaining communication range.

Embodiment 8

Embodiment 8 illustrates a structure schematic diagram of first location information in 2nd-stage SCI and first communication range according to one embodiment of the present disclosure, as shown in FIG. 8. FIG. 8 only illustrates partial fields of 2nd-stage SCI.

In one embodiment, the 2nd-stage SCI comprises the first location information and the first communication range.

In one embodiment, the first location information is represented by 12 bits.

In one embodiment, the first location information is represented by 8 bits.

In one embodiment, the first location information is represented by 5 bits.

In one embodiment, the first communication range is represented by 4 bits.

In one embodiment, the first communication range is represented by 5 bits.

In case A in Embodiment 8, the 2nd-stage SCI comprises a relay transmission identifier.

In one embodiment, the relay transmission identifier is represented by 1 bit.

In case B in Embodiment 8, the 2nd-stage SCI comprises relay transmission times.

In one embodiment, the relay transmission times is represented by 1 bit.

In one embodiment, the relay transmission times is represented by 2 bit.

Embodiment 9

Figure 9:
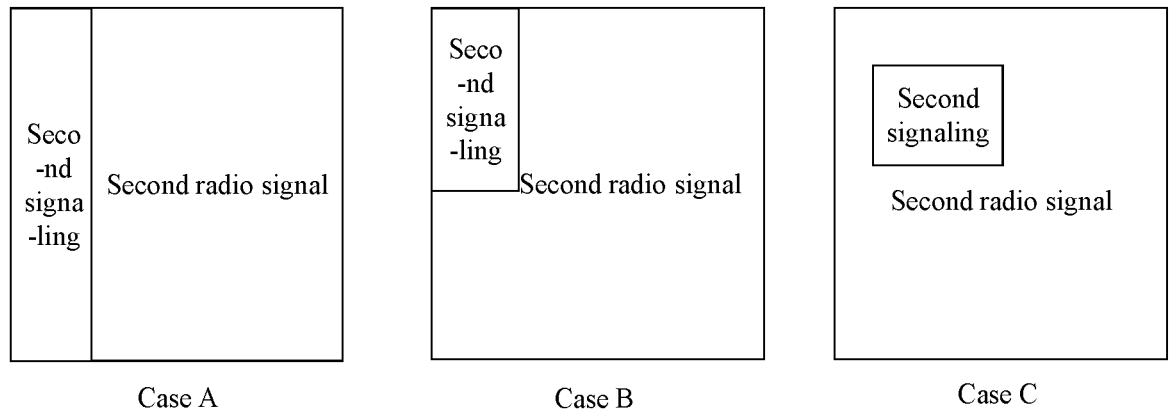
FIG. 9 illustrates a schematic diagram of time-frequency resources of a second signaling and a second radio signal according to one embodiment of the present disclosure.

Embodiment 9 illustrates a schematic diagram of time-frequency resources of a second signaling and a second radio signal according to one embodiment of the present disclosure, as shown in FIG. 9.

In one embodiment, the second signaling and the second radio signal occupy a same frequency-domain bandwidth.

In case A in Embodiment 9, the second signaling and the second radio signal are not multiplexed in frequency domain, and are multiplexed in time domain.

In case A in Embodiment 9, PSD of the first transmit power is the same with PSD of the second transmit power.

In one embodiment, a frequency-domain bandwidth of the second signaling is different from a frequency-domain bandwidth of the second radio signal.

In case B and case C in Embodiment 9, the second signaling and the second radio signal are respectively multiplexed in time domain and frequency domain, herein, in case B, the second signaling is not later than time-domain resources of the second radio signal, and in case C, time-domain resources of the second signaling can be in time-domain resources of the second radio signal.

Embodiment 10

Figure 10:
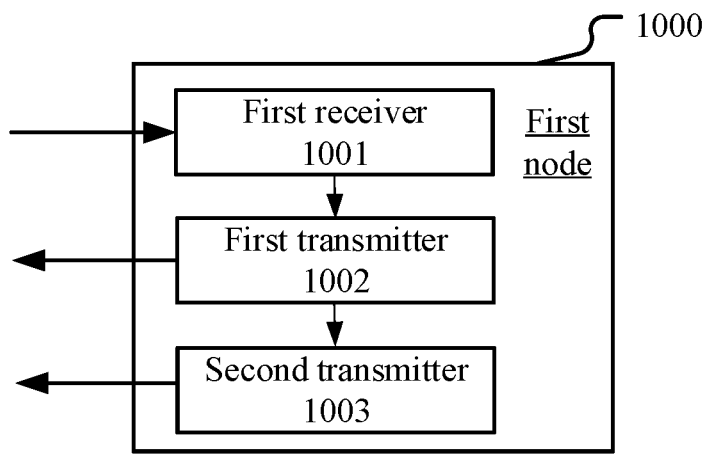
FIG. 10 illustrates a structure block diagram of a processing device in a first node according to one embodiment of the present disclosure.

Embodiment 10 illustrates a structure block diagram of a processing device in a first node according to one embodiment of the present disclosure, as shown in FIG. 10. In FIG. 10, a first node's processing device 1000 comprises a first receiver 1001, a first transmitter 1002 and a second transmitter 1003. The first receiver 1001 comprises the transmitter/receiver 456 (including the antenna 460), the receiving processor 452 and the controller/processor 490 in FIG. 4 of the present disclosure; the first transmitter 1002 comprises the transmitter/receiver 456 (including the antenna 460), the transmitting processor 455 and the controller/processor 490; and the second transmitter 1003 comprises the transmitter/receiver 456 (including the antenna 460), the transmitting processor 455 and the controller/processor 490.

In Embodiment 10, the first receiver 1001 receives the first signaling, and the first signaling indicates first location information and a first communication range; determines a second communication range according to the first location information and the first communication range; the first transmitter 1002, when the second communication range is greater than a first threshold, transmits a second signaling, and the second signaling indicates second location information and the second communication range; herein, the second communication range is smaller than the first communication range, and the first threshold is a value greater than 0.

In one embodiment, the first receiver 1001 receives first information, and the first information indicates the second location information; determines a first distance according to the first location information and the second location information; herein, the second communication range is determined by a difference value of the first communication range minus the first distance.

In one embodiment, the first receiver 1001 receives a first radio signal, and recovers a first bit block according to the first radio signal; the first transmitter 1002 transmits a second radio signal; herein, the first bit block is used for generating the second radio signal; the first signaling comprises configuration information of the first radio signal; and the second signaling comprises configuration information of the second radio signal.

In one embodiment, the first receiver 1001 receives second information, and the second information indicates maximum transmit power; the first transmitter 1002 transmits the second signaling with first transmit power; herein, the first transmit power is not greater than the maximum transmit power.

In one embodiment, the first receiver 1001 receives second information, and the second information indicates maximum transmit power; the first transmitter 1002 transmits the second radio signal with second transmit power; herein, the second transmit power is not greater than the maximum transmit power.

In one embodiment, the first receiver 1001 receives second information, and the second information indicates maximum transmit power; determines third transmit power according to a Downlink pathloss of the first node; herein, the first transmit power is a smaller one of the third transmit power and the maximum transmit power.

In one embodiment, the first receiver 1001 receives second information, and the second information indicates maximum transmit power; determines fourth transmit power according to a Downlink pathloss of the first node; herein, the second transmit power is a smaller one of the fourth transmit power and the maximum transmit power.

In one embodiment, the first receiver 1001 receives a first radio signal, and recovers a first bit block according to the first radio signal; the second transmitter 1003, when the received first radio signal is a first transmission of the first bit block, and the first radio signal is not successfully decoded, transmits a NACK.

Embodiment 11

Figure 11:
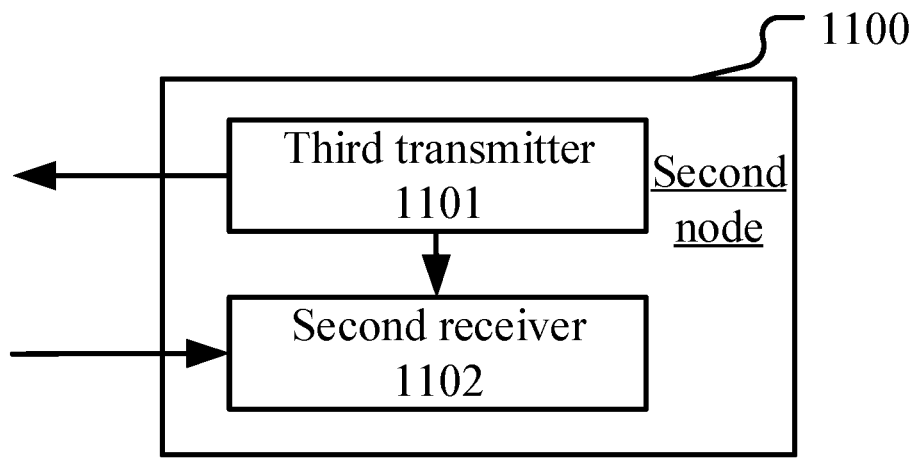
FIG. 11 illustrates a structure block diagram of a processing device in second node according to one embodiment of the present disclosure.

Embodiment 11 illustrates a structure block diagram of a processing device in a second node according to one embodiment of the present disclosure, as shown in FIG. 11. In FIG. 11, a second node's processing device 1100 comprises a third transmitter 1101 and a second receiver 1102. The third transmitter 1101 comprises the transmitter/receiver 416 (including the antenna 420), the transmitting processor 415 and the controller/processor 440 in FIG. 4 of the present disclosure; and the second receiver 1102 comprises the transmitter/receiver 416 (including the antenna 420), the receiving processor 412 and the controller/processor 440 in FIG. 4 of the present disclosure.

In Embodiment 11, the third transmitter 1101 transmits a first signaling, and the first signaling indicates first location information and a first communication range; the first location information and the first communication range are used for determining a second communication range; herein, the second communication range is used for determining whether a second signaling is transmitted, and the second signaling indicates second location information and the second communication range.

In one embodiment, the first location information and the second location information are used for determining a first distance; herein, the second communication range is determined by a difference value of the first communication range minus the first distance.

In one embodiment, the third transmitter 1101 transmits a first radio signal; herein, a first bit block is used for generating the first radio signal, the first signaling comprises configuration information of the first radio signal; a first bit block is used for generating the second radio signal, and the second signaling comprises configuration information of the second radio signal.

In one embodiment, first transmit power is used for transmitting the second signaling; herein, the first transmit power is not greater than maximum transmit power, and the maximum transmit power is used for determining maximum allowable transmit power.

In one embodiment, second transmit power is used for transmitting the second radio signal; herein, the second transmit power is not greater than maximum transmit power, and the maximum transmit power is used for determining maximum allowable transmit power.

In one embodiment, a Downlink pathloss is used for determining third transmit power for transmitting the second signaling; herein, the first transmit power is a smaller one of the third transmit power and maximum transmit power, and the maximum transmit power is used for indicating maximum allowable transmit power.

In one embodiment, a Downlink pathloss is used for determining fourth transmit power for transmitting the second radio signal; herein, the second transmit power is a smaller one of the fourth transmit power and maximum transmit power, and the maximum transmit power is used for indicating maximum allowable transmit power.

In one embodiment, the second receiver 1102, when the transmitted first radio signal is a first transmission of the first bit block, monitors a NACK.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. A first-type communication node or a UE or a terminal in the present disclosure includes but not limited to mobile phones, tablet computers, laptops, network cards, low-power devices, enhanced Machine Type Communication (eMTC) devices, NB-IOT devices, vehicle-mounted communication equipment, aircrafts, airplanes, unmanned aerial vehicles (UAV), telecontrolled aircrafts and other wireless communication devices. The second-type communication node or the base station or the network side device in the present disclosure includes but is not limited to the macro-cellular base stations, micro-cellular base stations, home base stations, relay base stations, eNB, gNB, Transmission and Reception Points (TRP), relay satellites, satellite base stations, air base stations and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling, the first signaling indicating first location information and a first communication range; determining a second communication range according to the first location information and the first communication range; and
a first transmitter, when the second communication range is greater than a first threshold, transmitting a second signaling, the second signaling indicating second location information and the second communication range;
wherein the second communication range is smaller than the first communication range, and the first threshold is a value greater than 0.

2. The first node according to claim 1, comprising:
the first receiver, receiving first information, the first information indicating the second location information; and determining a first distance according to the first location information and the second location information;
wherein the second communication range is determined by a difference value of the first communication range minus the first distance.

3. The first node according to claim 1, comprising:
the first receiver, receiving a first radio signal, recovering a first bit block according to the first radio signal; and
the first transmitter, transmitting a second radio signal;
wherein the first bit block is used for generating the second radio signal; the first signaling comprises configuration information of the first radio signal; and the second signaling comprises configuration information of the second radio signal.

4. The first node according to claim 3, comprising:
the first receiver, receiving second information, the second information indicating maximum transmit power; and
the first transmitter, transmitting the second signaling with first transmit power;
wherein the first transmit power is not greater than the maximum transmit power.

5. The first node according to claim 4, comprising:
the first transmitter, transmitting the second radio signal with second transmit power;
wherein the second transmit power is not greater than the maximum transmit power.

6. The first node according to claim 3, comprising:
the second transmitter, when the received first radio signal is a first transmission of the first bit block, and the first radio signal is not successfully decoded, transmitting a NACK.

7. The first node according to claim 6, wherein the first radio signal is the first transmission of the first bit block includes: when maximum M relay transmission(s) is configured to be allowable, the first bit block is transmitted in a first transmission occasion of M relay transmission occasion(s).

8. A second node for wireless communications, comprising:
a third transmitter, transmitting a first signaling, the first signaling indicating first location information and a first communication range;
wherein the first location information and the first communication range are used for determining a second communication range; when the second communication range is greater than a first threshold, a second signaling is transmitted, and the second signaling indicates second location information and the second communication range; the second communication range is smaller than the first communication range, and the first threshold is a value greater than 0.

9. The second node according to claim 8, comprising:
first information being received, the first information indicating the second location information; the first location information and the second location information being used for determining a first distance;
wherein the second communication range is determined by a difference value of the first communication range minus the first distance.

10. The second node according to claim 8, comprising:
a third transmitter, transmitting a first radio signal;
wherein a first bit block is used for generating the first radio signal, the first signaling comprises configuration information of the first radio signal; a first bit block is used for generating the second radio signal, and the second signaling comprises configuration information of the second radio signal.

11. The second node according to claim 10, comprising:
first transmit power being used for transmitting the second signaling;
wherein the first transmit power is not greater than maximum transmit power, and the maximum transmit power is used for determining maximum allowable transmit power.

12. The second node according to claim 11, comprising:
second transmit power being used for transmitting the second radio signal;
wherein the second transmit power is not greater than the maximum transmit power.

13. The second node according to claim 10, comprising:
a second receiver, when the transmitted first radio signal is a first transmission of the first bit block, monitoring a NACK.

14. A method in a first node for wireless communications, comprising:
receiving a first signaling, the first signaling indicating first location information and a first communication range; determining a second communication range according to the first location information and the first communication range; and
when the second communication range is greater than a first threshold, transmitting a second signaling, the second signaling indicating second location information and the second communication range;
wherein the second communication range is smaller than the first communication range, and the first threshold is a value greater than 0.

15. The method in a first node according to claim 14, comprising:
receiving first information, the first information indicating the second location information; and determining a first distance according to the first location information and the second location information;
wherein the second communication range is determined by a difference value of the first communication range minus the first distance.

16. The method in a first node according to claim 14, comprising:
receiving a first radio signal, recovering a first bit block according to the first radio signal; and
transmitting a second radio signal;
wherein the first bit block is used for generating the second radio signal; the first signaling comprises configuration information of the first radio signal; and the second signaling comprises configuration information of the second radio signal.

17. The method in a first node according to claim 16, comprising:
receiving second information, the second information indicating maximum transmit power; and
transmitting the second signaling with first transmit power;
wherein the first transmit power is not greater than the maximum transmit power.

18. The method in a first node according to claim 17, comprising:
transmitting the second radio signal with second transmit power;
wherein the second transmit power is not greater than the maximum transmit power.

19. The method in a first node according to claim 16, comprising:
when the received first radio signal is a first transmission of the first bit block, and the first radio signal is not successfully decoded, transmitting a NACK.

20. The method in a first node according to claim 19, wherein the first radio signal is the first transmission of the first bit block includes: when maximum M relay transmission(s) is configured to be allowable, the first bit block is transmitted in a first transmission occasion of M relay transmission occasion(s).

* * * * *